US009797287B2

(12) United States Patent
Bartley et al.

(10) Patent No.: US 9,797,287 B2
(45) Date of Patent: Oct. 24, 2017

(54) RUTHENIUM BASED CATALYSTS FOR NOX REDUCTION

(71) Applicant: Southwest Research Institute, San Antonio, TX (US)

(72) Inventors: Gordon J. J. Bartley, San Antonio, TX (US); Terrence F. Alger, II, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 14/885,147

(22) Filed: Oct. 16, 2015

(65) Prior Publication Data

US 2017/0107880 A1    Apr. 20, 2017

(51) Int. Cl.

| | |
|---|---|
| *F01N 3/10* | (2006.01) |
| *F01N 3/20* | (2006.01) |
| *F02M 35/104* | (2006.01) |
| *F02M 26/13* | (2016.01) |
| *F01N 3/28* | (2006.01) |
| *B01J 23/46* | (2006.01) |
| *B01J 35/00* | (2006.01) |
| *B01J 35/10* | (2006.01) |
| *B01D 53/94* | (2006.01) |

(52) U.S. Cl.
CPC ......... *F01N 3/2066* (2013.01); *B01D 53/945* (2013.01); *B01J 23/462* (2013.01); *B01J 35/0006* (2013.01); *B01J 35/1014* (2013.01); *B01J 35/1019* (2013.01); *F01N 3/2803* (2013.01); *F02M 26/13* (2016.02); *F02M 35/104* (2013.01); *B01D 2255/1026* (2013.01); *F01N 2570/14* (2013.01); *F01N 2610/00* (2013.01)

(58) Field of Classification Search
USPC .......... 60/274, 278, 286, 295, 297, 299, 301
See application file for complete search history.

(56) References Cited

U.S. PATENT DOCUMENTS

| | | | | |
|---|---|---|---|---|
| 3,895,093 | A * | 7/1975 | Weidenbach | ........ B01D 53/945 |
| | | | | 423/213.5 |
| 5,670,443 | A * | 9/1997 | Irite | ................... B01D 53/9418 |
| | | | | 423/213.2 |
| 5,879,645 | A | 3/1999 | Park et al. | |
| 7,047,728 | B2 * | 5/2006 | Yasui | .................. F02D 41/1494 |
| | | | | 60/274 |

(Continued)

OTHER PUBLICATIONS

Ceviz, et al; "Analysis of the Thermal Efficiency and Cyclic Variations in a SI Engine Under Lean Combustion Conditions"; Journal of Thermal Science and Technology, vol. 31, No. 1, 2011, Printed in Turkey, pp. 121-127.

(Continued)

*Primary Examiner* — Binh Q Tran
(74) *Attorney, Agent, or Firm* — Grossman, Tucker et al

(57) ABSTRACT

The present disclosure is directed at a ruthenium based catalyst for NOx reduction. More specifically, ruthenium based catalysts are used for NOx reduction in an internal combustion engine to reduce $NO_X$ to nitrogen, at relatively high conversion and selectivity, using carbon monoxide and hydrogen as reductants. The ruthenium based catalyst has particular utility in exhaust gas recirculation such as in dedicated exhaust gas recirculation (D-EGR) systems.

9 Claims, 3 Drawing Sheets

(56) References Cited

U.S. PATENT DOCUMENTS

| | | |
|---|---|---|
| 7,135,153 B2 | 11/2006 | Bartley et al. |
| 7,163,668 B2 | 1/2007 | Bartley et al. |
| 7,357,900 B2 | 4/2008 | Bartley et al. |
| 7,624,628 B2 | 12/2009 | Bartley |
| 8,815,193 B1 | 8/2014 | Feng et al. |
| 9,657,692 B2 | 5/2017 | Chiu |
| 2004/0018132 A1 | 1/2004 | Bartley et al. |
| 2004/0170548 A1 | 9/2004 | Bartley et al. |
| 2006/0034740 A1* | 2/2006 | Li .................. B01D 53/9422 423/213.5 |
| 2007/0079600 A1 | 4/2007 | Bartley et al. |
| 2009/0035192 A1* | 2/2009 | Hwang ................ B01D 53/90 422/170 |
| 2009/0158813 A1 | 6/2009 | Bartley |
| 2014/0142833 A1* | 5/2014 | Gingrich ............ F02D 41/0255 701/103 |
| 2017/0074214 A1 | 3/2017 | Chiu |

OTHER PUBLICATIONS

Hornung, et al; "On the Mechanism of the Selective Catalytic Reduction of NO to N2 by H2 over Ru/MgO and Ru/Al2O3 Catalysts", Topics in Catalysis 11/12 (2000); pp. 263-270.

Viendera, et al; "Mass Fraction Burned Analysis"; Journal of KONES Internal Combustion Engines, 2002, No. 3-4, pp. 193-201.

* cited by examiner

RUTHENIUM BASED CATALYSTS FOR NOX REDUCTION

FIELD

The present disclosure is directed at a ruthenium based catalyst for NOx reduction. More specifically, ruthenium based catalysts are used for NOx reduction in an internal combustion engine to reduce $NO_X$ to nitrogen, at relatively high conversion and selectivity, using carbon monoxide and hydrogen as reductants. The ruthenium based catalyst therefore has particular utility in exhaust gas recirculation such as in dedicated exhaust gas recirculation (D-EGR) systems.

BACKGROUND

Nitric oxides ($NO_x$), mainly including nitric oxide (NO) and nitrogen dioxide ($NO_2$), are some of the most toxic pollutants formed during combustion processes. $NO_x$ are precursors of both acid precipitation and ozone formation, and play important roles in the environment through acidification, forest damage, smog formation, damage to human health, depletion of the stratospheric ozone layer, and the greenhouse effect. Most $NO_x$ emissions come from automobiles, industrial boilers, refineries, and waste incineration plants, etc. Environmental protection and stringent emission limits both require a significant reduction of $NO_x$ emissions from stationary combustors.

Various technological approaches have been applied to $NO_x$ reduction from stationary sources. The two major categories of $NO_x$ control for stationary applications are precombustion control and post-combustion control. Precombustion control technologies include low $NO_x$ burner, overfire air (OFA) systems, exhaust gas recirculation (EGR), and more precisely controlled combustion parameters. Post-combustion treatments include aftertreatment technologies, such as selective catalytic reduction (SCR), selective non-catalytic reduction (SNCR), reburning, and the combination of these aftertreatment technologies.

Magnesia- and alumina-supported ruthenium catalysts have been reported for use in the selective catalytic reduction of nitric oxide with hydrogen. See, "*On The Mechanism Of The Selective Catalytic Reduction Of NO to $N_2$ By $H_2$ over Ru/MgO and Ru/$Al_2O_3$*", A Hornung et al, Topics in Catalysis, 11/12 (2000) 263-270.

Accordingly, a need exists to improve on the methods and apparatus that are employed for SCR in order to provide a SCR system that results in more efficient NOx removal.

SUMMARY

A method for selective catalytic reduction of exhaust gases from hydrocarbon combustion comprising providing a ruthenium based catalyst on an inorganic support and introducing to the ruthenium based catalyst a mixture of an exhaust gas containing NOx in combination with carbon monoxide and hydrogen. This is then followed by reducing the $NO_x$ to nitrogen wherein carbon monoxide and hydrogen act as reductants and the $NO_x$ is reduced to nitrogen at a selectivity of greater than or equal to 90%.

A method for selective catalytic reduction of exhaust gases from hydrocarbon combustion in an internal combustion engine comprising operating one or more cylinders as non-dedicated exhaust gas recirculation cylinder(s) and operating one or more cylinders as dedicated exhaust gas recirculation cylinder(s) such that its exhaust, during all or some engine cycles, is recirculated via an exhaust gas recirculation loop as exhaust gas recirculation gas. This is followed by providing a ruthenium based catalyst on an inorganic support and introducing to the ruthenium based catalyst the exhaust gas from the one or more exhaust gas recirculating cylinders where the exhaust gas contains NOx in combination with carbon monoxide and hydrogen. This is the followed by reducing the $NO_x$ to nitrogen wherein carbon monoxide and hydrogen act as reductants and the $NO_x$ is reduced to nitrogen at a selectivity of greater than or equal to 90%.

A system for treating exhaust gas output from an internal combustion engine having a number of cylinders comprising one or more main cylinders connected to an intake manifold, one or more cylinders operable as dedicated exhaust gas recirculation cylinder(s) including an exhaust gas recirculation loop and a ruthenium based catalyst position in the exhaust gas recirculation loop.

DETAILED DESCRIPTION

Figure 1:
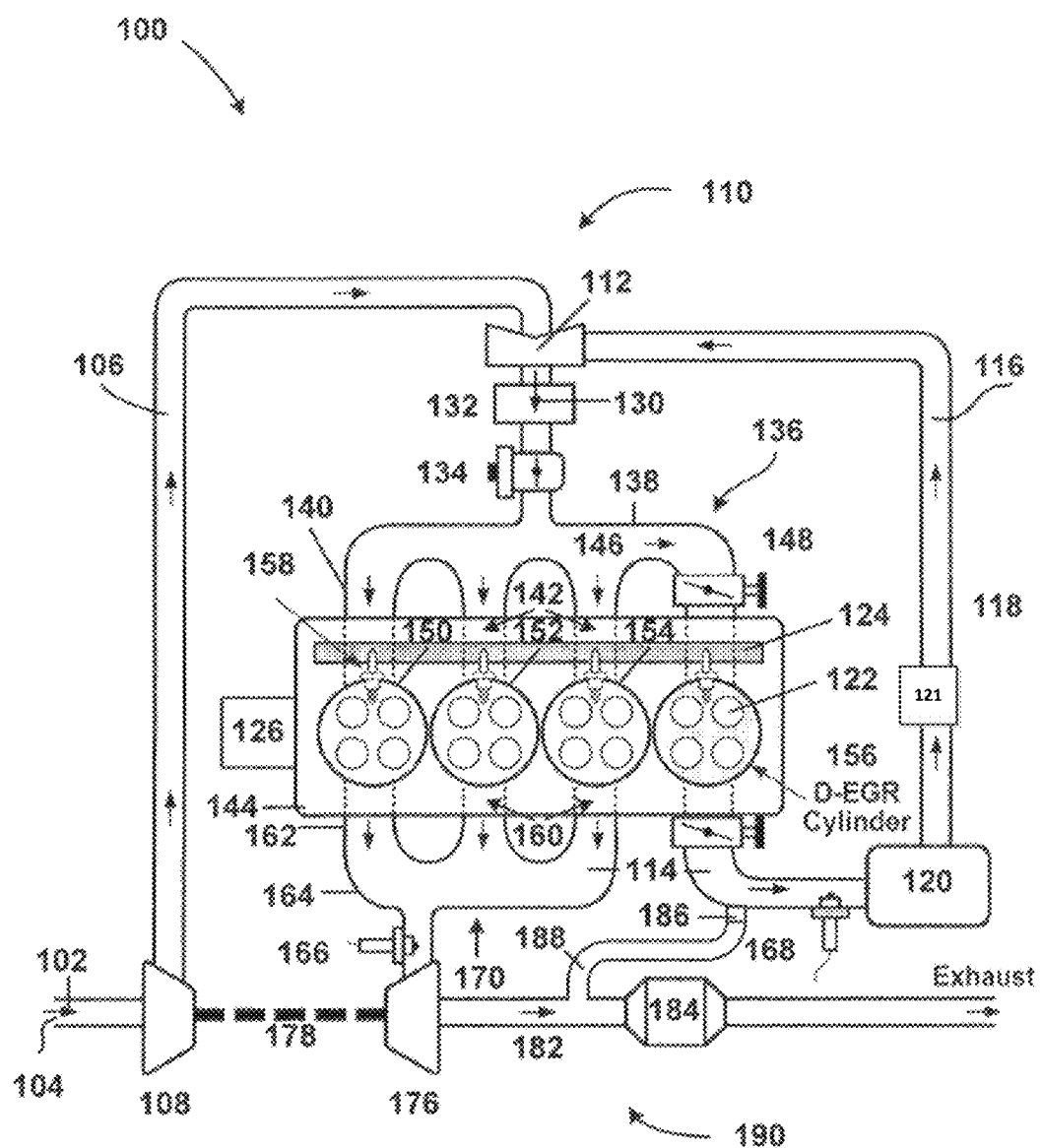
FIG. 1 is a schematic drawing of an inline four cylinder engine with one example of a dedicated exhaust gas recirculation (D-EGR) cylinder that may be employed in conjunction with the ruthenium based catalyst system described herein.

The present disclosure is directed at ruthenium based catalysts in selective catalytic reduction systems for NOx reduction to nitrogen, where carbon monoxide (CO) and hydrogen ($H_2$) are available as the reductants. Reference to ruthenium based catalyst is reference to a catalyst that contains the element ruthenium (Ru). The ruthenium based catalyst may therefore now be advantageously employed in any combustion process where CO and $H_2$ are available, and preferably, in various configurations of an exhaust gas recirculation (EGR) system associated with internal combustion engines utilizing a hydrocarbon fuel.

With EGR configurations, one or more cylinders of the internal combustion engine may specifically be utilized to generate exhaust gas, which is then recirculated and mixed with an intake stream of air to provide a mixed charge (mixture) of exhaust gas and air to the cylinders of the engine. For the purposes of this disclosure, and as one preferred placement of the ruthenium based catalyst herein, an engine configured such that substantially the entire output of exhaust gas from the cylinder is to be recirculated for EGR is referred to as an engine having a dedicated exhaust gas cylinder, or D-EGR. However, it should again be appreciated that the ruthenium based catalyst herein would be applicable to any combustion system, where carbon monoxide and hydrogen are available as reductants and there is a need for $NO_x$ reduction.

The ruthenium based catalyst herein is preferably a ruthenium supported catalyst, which is reference to the feature that the ruthenium is supported by an otherwise inert and solid catalyst carrier. For example, one may preferably utilize as the catalyst support an inorganic oxide, including, but not limited to, $Al_2O_3$, MgO, $SiO_2$, $CeO_2$, $ZrO_2$, $MoO_2$, $MoO_3$, $WO_2$, $ZrO_2$, $TiO_2$, mixed oxides or composite oxides of any two or more thereof. One particularly preferred supported ruthenium based catalyst herein comprises a Ru/Al$_2$O$_3$ formulation. The level of Ru loading on the support preferably falls in the range of 0.10 wt. % to 10.0 wt. %, including all values therein at 0.10 wt. % increments. Accordingly, the load level may preferably be 0.10 wt. %, 0.20 wt. %, 0.30 wt. %, 0.40 wt. %, 0.50 wt. %, etc., and up to and include 10.0 wt. %. One particularly preferred level of Ru loading is in the range of 3.0 wt. % to 7.0 wt. % on the inorganic oxide carrier. The inorganic oxides herein may also preferably have a surface area in the range of 50 m$^2$/g to 250 m$^2$/g.

The general reaction with respect to the ruthenium based catalyst, where CO and H$_2$ serve as the reductant, may be represented by the following:

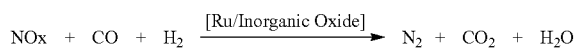

In the particular case of NO reduction, the reaction would proceed as follows:

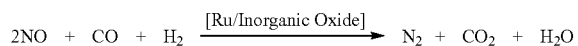

As noted above, the ruthenium based catalyst herein may therefore be applied to any combustion process where there is a source of CO and H$_2$. One example of such a source is from a D-EGR combustion type engine, one example of which is now illustrated in FIG. 1.

More specifically, FIG. 1 illustrates an internal combustion engine 100 having four cylinders 150, 152, 154 and 156. One of the cylinders, cylinder 156, may be understood to be a dedicated EGR cylinder. In other words, it may be understood that substantially all of the exhaust gas expelled from cylinder 156 may be directed (recirculated) back to the intake system 110, here through an EGR feedback loop 118. The exhaust gas from the remaining three cylinders 150, 152, and 154 is directed to an exhaust system 190, with none of the exhaust gas expelled from cylinders 150, 152 and 154 recirculated to the intake system 110 of engine 100.

While it may be possible, based on the configuration of engine 100, for all of the exhaust gas (i.e. 100%) expelled from cylinder 156 to be optimally recirculated back to the intake system 110, it should be understood that certain design considerations and operating inefficiencies may only allow substantially all the exhaust gas expelled from cylinder 156 to be recirculated back to the intake system 110. For example, exhaust gas losses may occur between connection points (e.g. loop 118 and cylinder head 144), or other connection points between separate components. Accordingly, it is contemplated that on a volume basis, 90% or more of the exhaust gas expelled from the dedicated EGR cylinder is recirculated to the engine intake system 110. More preferably, 90-100% of the exhaust gas expelled from cylinder 156 is recirculated, including all values therein, in 0.1% by volume increments.

Furthermore, engine 100 may also be understood to have a maximum "25% dedicated EGR" because the exhaust gas expelled from each cylinder may be understood to have substantially the same volume, and one of the four cylinders has 100% of its exhaust gas redirected to the intake system 110, as noted above.

During an operation of engine 100, ambient intake air 102 may enter air inlet 104 of air intake system 110. The air 102 may then travel within intake passage 106, during which time it may be compressed by compressor 108. Thereafter, air 102 may enter distributor/mixer apparatus 112 of air intake system 110, which provides an exhaust gas recirculation apparatus configured to distribute and mix recirculated exhaust gas 114 in a stream of air 102 to be introduced to the internal combustion engine 100, particularly statically (with no moving structure).

Also with the operation of engine 100, exhaust gas 114 from dedicated EGR cylinder 156 may enter passage 116 of EGR feedback loop 118. Thereafter, exhaust gas 114 may enter distributor/mixer apparatus 112 of the air intake system 110 and be distributed and mixed with a stream of air 102 to provide a mixture 130 thereof.

Prior to entering distributor/mixer apparatus 112, one or more components of the exhaust gas 114 may first optionally react with water using a water gas shift reaction (WGSR) with a suitable water gas shift (WGS) catalyst 120. With the WGS reaction, carbon monoxide (CO) in the exhaust gas 114 may react with water (H$_2$O) to produce carbon dioxide (CO$_2$) and hydrogen (H$_2$) according to the reaction:

$$CO+H_2O \rightarrow CO_2+H_2$$

Examples of WGS catalysts may include iron oxides (Fe$_3$O$_4$) or other transition metals and transition metal oxides.

At 121, there is placement of the ruthenium based catalyst system noted above. Accordingly, as the D-EGR cylinder may be readily operated under rich combustion conditions, i.e., where there is less than 14.7 parts of air to 1 part of fuel. This will then generate CO and H$_2$ for the ensuing downstream use as reductants for the selective catalytic reduction in the presence of ruthenium, and conversion to nitrogen as described herein.

Continuing then with the description of FIG. 1, after distributor/mixer apparatus 112, air/exhaust gas mixture 130 may then flow in passage 106 to intercooler 132 to remove heat therefrom and correspondingly increase the density thereof. After being cooled by intercooler 132, air/exhaust gas mixture 130 may then flow to an intake flow restrictor 134, such as an intake throttle valve (a mechanism which by which a flow of the air/exhaust gas mixture 130 is managed by restriction or obstruction) configured to restrict the volumetric flow and amount (mass) of air/exhaust gas mixture 130 provided to cylinders 150, 152, 154 and 156. The intake throttle valve may more particularly comprise a butterfly valve that restricts the flow and amount of air/exhaust gas mixture 130 entering the intake manifold 136 and ultimately provided to cylinders 150, 152, 154 and 156. Intake flow restrictor 134 may be considered to be a primary flow restrictor in that it may similarly restrict the flow of the air/exhaust gas mixture 130 to all of cylinders 150, 152, 154 and 156.

Intake flow restrictor 134 may be located at the entrance of intake manifold 136. Intake manifold 136 may comprise a plenum 138 through which the air/exhaust gas mixture 130 may flow to a plurality of intake passages/runners 140, shown with one passage/runner 140 dedicated to each cylinder 150-156. Each passage/runner 140 may then feed the air/exhaust gas mixture 130 directly into an intake port 142 (shown by dotted lines) of a cylinder head 144, shown with one port 142 dedicated to each cylinder 150-156.

After entering cylinders 150-156, the air/exhaust gas mixture 130 may be ignited by igniter 158 (e.g. spark plug) and combust therein. After combustion of the air/exhaust gas mixture 130 within cylinders 150-156, exhaust gas 114 from cylinders 150, 152 and 154 may flow through exhaust ports 160 of cylinder head 144 and exhaust passages/runners 162 of exhaust manifold 170, shown with one exhaust port 160 and one passage/runner 162 dedicated to each cylinder 150-154, and then be collected in collector 164.

From collector 164, exhaust gas 114 may then flow through turbine 176, which may turn compressor 108 by shaft 178. After turbine 176, exhaust gas 114 may flow through exhaust passage 182 to catalytic converter 184 to be treated therein before being expelled from exhaust system 190 and into the atmosphere. Catalytic converter 184 may comprise a three-way catalytic converter. In other words, a catalytic converter which performs the following:

Reduction of nitrogen oxides to nitrogen and oxygen by the reaction:

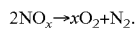

$$2NO_x \rightarrow xO_2 + N_2.$$

Oxidation of carbon monoxide to carbon dioxide by the reaction:

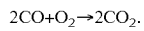

$$2CO + O_2 \rightarrow 2CO_2.$$

Oxidation of unburnt hydrocarbons (HC) to carbon dioxide and water by the reaction:

$$C_xH_{2x+2} + [(3x+1)/2]O_2 \rightarrow xCO_2 + (x+1)H_2O.$$

To control the air/fuel ratio, exhaust gas 114 from cylinders 150, 152 and 154 may be sampled by an exhaust gas oxygen (EGO) sensor 166, which may more particularly comprise a heated exhaust gas oxygen (HEGO) sensor, while exhaust gas 114 from cylinder 156 may be sampled by an exhaust gas oxygen (EGO) sensor 168, which may more particularly comprise a universal exhaust gas oxygen (UEGO) sensor.

To control the mass and volumetric flow rate of the air/exhaust gas mixture 130 entering dedicated EGR cylinder 156, the portion of the intake passage 146 dedicated to cylinder 156 may include an intake charge flow restrictor 148, such as a throttle valve, configured and arranged to restrict the flow and amount of air/exhaust gas mixture 130 entering cylinder 156 without restricting the flow and amount of air/exhaust gas mixture 130 entering remaining cylinders 150, 152 or 154. The throttle may more particularly comprise a butterfly valve that restricts the amount of air/exhaust gas mixture 130 entering cylinder 156. Flow restrictor 148 may be considered to be a secondary flow restrictor in that it may restrict the flow of the air/exhaust gas mixture 130 to a particular cylinder, here cylinder 156, as opposed to all the cylinders, after the air/exhaust gas mixture 130 has flowed past primary flow restrictor 134.

As shown in FIG. 1, flow restrictor 148 may be located on the intake side of cylinder 156 for intake restriction, or on the exhaust side of cylinder 156 for exhaust restriction. However, it may be expected that flow restrictor 148 would be better positioned on the intake side of cylinder 156 to reduce back pressure thereon which may be associated with use of flow restrictor 148 on the exhaust side of cylinder 156. When positioned on the intake side of engine 100, flow restrictor 148 may be attached to the intake manifold 136, or arranged between the intake manifold 136 and the cylinder head 144. When positioned on the exhaust side of engine 100, flow restrictor 148 may be attached to the exhaust passage 166, or located between the exhaust passage 116 and the cylinder head 144.

With the foregoing configuration, as flow restrictor 148 may be at least partially closed, the flow and amount of air/exhaust gas mixture 130 entering cylinder 156 may be decreased. Simultaneously, the air/exhaust gas mixture 130 entering cylinders 150, 152 and 154 may be increased, provided flow restrictor 134 remains unchanged. Thus, the flow and amount of the air/exhaust gas mixture 130 entering cylinder 156 may be inversely related to the flow and amount of the air/exhaust gas mixture 130 entering cylinders 150, 152 and 154. That is, as the flow and amount of the air/exhaust gas mixture 130 entering cylinder 156 may be decreased, the flow and amount of the air/exhaust gas mixture 130 entering cylinders 150, 152 and 154 may be increased, and vice-versa.

As indicated above, without the use of flow restrictor 148, the engine 100 in FIG. 1 may be understood to have "25% dedicated EGR" because the exhaust gas expelled from each cylinder 150-156 may be understood to have substantially the same volume, and one of the four cylinders, cylinder 156, has 90-100% by volume of its exhaust gas redirected to the intake manifold 136. However, with the use of flow restrictor 148, the volume of exhaust gas expelled from cylinder 156 may now be varied by restricting the amount of air/exhaust gas 130 which is consumed by cylinder 156 such at the engine 100 may provide, for example, between 0.1% and 25% dedicated EGR. By decreasing the flow and amount of air/exhaust gas 130 which is consumed by cylinder 156, the flow and amount of exhaust gas 114 expelled from cylinder 156 and routed through EGR loop 118 to air intake system 110 may be correspondingly decreased, which will decrease amount of exhaust gas 114 provided to the cylinders 150-156.

Furthermore, flow restrictor 148 may be used in conjunction with valves 122, fuel injector 124 and engine controller 126 of engine 100 to operate or otherwise control dedicated EGR cylinder 156 at the same or different air/fuel ratio than cylinders 150, 152 and 154. Further, each cylinder 150-156 may be independently operated at an air/fuel ratio which is greater than (rich), equal to, or less than (lean) a stoichiometric ratio for the air and fuel.

The efficiency of the ruthenium based catalyst described herein was confirmed using Southwest Research Institute's Universal Synthetic Gas Reactor® which evaluates the performance of catalysts in connection with selective catalytic reduction technology. In sum, conditions are configured to simulate engine exhaust conditions for selected fuels followed by identification of conversion efficiency versus temperature for a particular chemical component. More specifically, a computer controlled gas blending system is provided along with a range of analyzers, including fourier transform infrared (FTIR) analysis which provides real-time evaluation of the presence of, e.g., $NO_x$, CO, $CO_2$ as well as overall NOx conversion efficiency to $N_2$.

Figure 2:
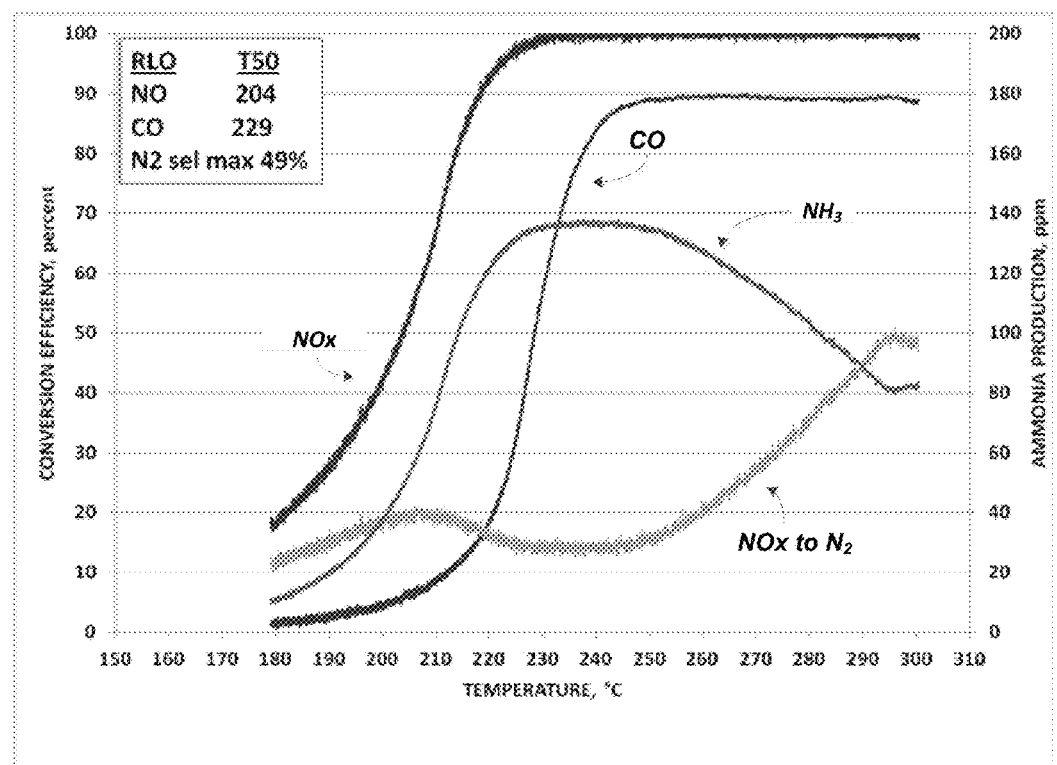
FIG. 2 is a graph of conversion efficiency versus temperature for a commercial three-way catalyst system.

FIG. 2 identifies the conversion efficiency versus temperature utilizing a commercial three-way catalyst described above. The inlet gas profile was as follows: CO 5625 ppm; $H_2$ 1875 ppm; NO 150 ppm, $O_2$ 4000 ppm, $N_2$ balance. Such three-way catalyst relies upon the presence of platinum, palladium and rhodium. The contemplated reaction profile is as follows:

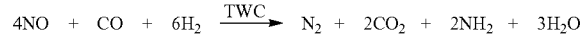

$$4NO + CO + 6H_2 \xrightarrow{TWC} N_2 + 2CO_2 + 2NH_2 + 3H_2O$$

It can be seen that NOx lit off (RLO) with a $T_{50}$ of 204° C., which is reference to the temperature where the conversion efficiency is 50%. CO indicates a $T_{50}$ of 229° C. Significantly, the selectivity to $N_2$, which is reference to the percent of NOx converted to $N_2$ at the identified temperature, was less than 50% across the test temperature range of 180° C. to 300° C. As can also be seen, the actual production of $NH_3$ is relatively significant over this same temperature range.

Figure 3:
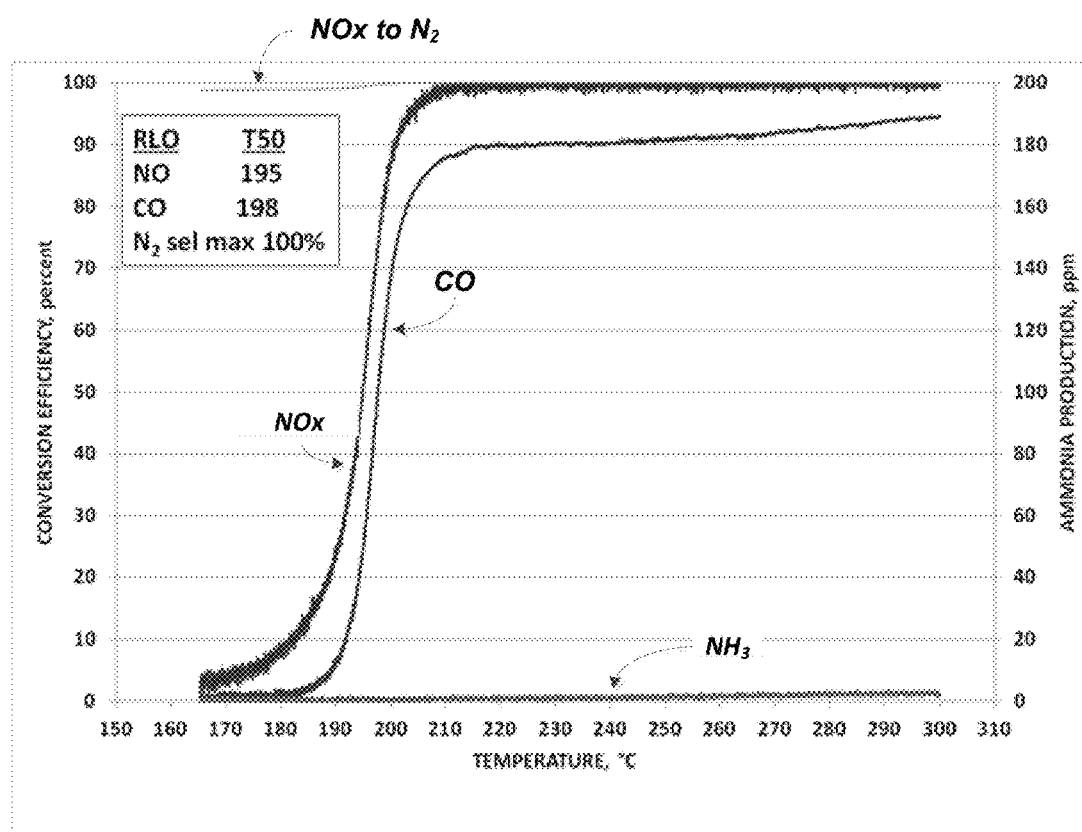
FIG. 3 is a graph of conversion efficiency versus temperature for a ruthenium based catalyst system disclosed herein.

FIG. 3 identifies the conversion efficiency versus temperature for the ruthenium based catalyst herein as applied to the same inlet gas profile identified above in FIG. 2. More specifically, the ruthenium based catalyst was a 5.0 wt. % $Ru/Al_2O_3$. As can be seen, the NO lit off with a $T_{50}$ of 195° C. and the selectivity to $N_2$ was clearly greater than 50% noted above for a commercial three-way catalyst, and in fact was ≥90.0%. More specifically, the selectivity to $N_2$ was confirmed to readily fall in the range of 90.0% to 100% over the temperature range of 165° C. to 300° C. Accordingly, the above also supports the conclusion that $NO_x$ may now be reduced to nitrogen at a selectivity of greater than or equal to 95% over this same temperature range. Meanwhile, the actual output production of $NH_3$ after treatment with the ruthenium based catalyst was indicated to be at or below 5.0 ppm, more specifically, at or below 2.5 ppm, and even more specifically, at or below 1.0 ppm, over the temperature range of 165° C. to 300° C.

It is now worth noting that Ru catalysts have been investigated before as potential three-way catalyst components for selective NOx reduction to $N_2$. However, under lean conditions (oxidizing) or even stoichiometric conditions (perturbating lean and rich) it has the problem that $RuO_4$ can form which is very volatile with a melting point of about 40° C. and boiling point around 100° C. However, if the catalyst is maintained in a reducing environment, as described herein, $RuO_4$ does not form. Indeed the catalytically active form of Ru in our catalyst is likely $RuO_2$ or even Ru metal. $RuO_2$ boiling point is 1200° C., and Ru metal has an amazing melting point of 2334° C. and boiling point of 4150° C.! So, under the reducing conditions described herein, and in particular that of the D-EGR application (and other rich burn applications) it is contemplated that the ruthenium based catalyst herein may now be efficiently relied upon to assist in NOx reduction in the combustion process.

What is claimed is:

1. A method for selective catalytic reduction of exhaust gases from hydrocarbon combustion in an internal combustion engine comprising:
   operating one or more cylinders as non-dedicated exhaust gas recirculation cylinder(s);
   operating one or more cylinders as dedicated exhaust gas recirculation cylinder(s) such that its exhaust, during all or some engine cycles, is recirculated via an exhaust gas recirculation loop as exhaust gas recirculation gas,
   providing a ruthenium based catalyst on an inorganic support;
   introducing to said ruthenium based catalyst said exhaust gas from said one or more exhaust gas recirculating cylinders, where said exhaust gas contains NOx in combination with carbon monoxide and hydrogen;
   reducing said $NO_x$ to nitrogen wherein carbon monoxide and hydrogen act as reductants and said $NO_x$ is reduced to nitrogen at a selectivity of greater than or equal to 90%.

2. The method of claim 1 wherein NOx is reduced to nitrogen at a selectivity of greater than or equal to 95%.

3. The method of claim 1 wherein reduction of NOx to nitrogen occurs over the temperature range of 165° C. to 300° C.

4. The method of claim 1 wherein said ruthenium based catalyst comprises 0.1-10.0 wt. % ruthenium on said inorganic support.

5. The method of claim 4 wherein said inorganic support is selected from $Al_2O_3$, MgO, $SiO_2$, $CeO_2$, $ZrO_2$, $MoO_2$, $MoO_3$, $WO_2$, $ZrO_2$, $TiO_2$ and mixtures thereof.

6. The method of claim 4 wherein said inorganic support has a surface area of 50 $m^2/g$ to 250 $m^2/g$.

7. The method of claim 1 wherein said dedicated exhaust gas cylinder is run at a rich air/fuel ratio.

8. The method of claim 1 wherein said ruthenium based catalyst outputs a level of ammonia of at or below 5.0 ppm.

9. The method of claim 8 where said output level of ammonia is at or below 2.5 ppm.

* * * * *